(12) United States Patent
Wood (10) Patent No.: US 9,857,529 B2
(45) Date of Patent: Jan. 2, 2018

(54) OPTICAL FIBER SPAN WITH LOW DIFFERENTIAL MODE DELAY

(71) Applicant: Corning Incorporated, Corning, NY (US)

(72) Inventor: William Allen Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/416,073

(22) Filed: Jan. 26, 2017

(65) Prior Publication Data
US 2017/0219769 A1    Aug. 3, 2017

Related U.S. Application Data

(60) Provisional application No. 62/288,843, filed on Jan. 29, 2016.

(51) Int. Cl.
| G02B 6/036 | (2006.01) |
|---|---|
| G02B 6/028 | (2006.01) |
| G02B 6/02 | (2006.01) |

(52) U.S. Cl.
CPC ....... *G02B 6/0288* (2013.01); *G02B 6/02009* (2013.01); *G02B 6/02042* (2013.01); *G02B 6/0365* (2013.01)

(58) Field of Classification Search
CPC .............. G02B 6/0288; G02B 6/02009; G02B 6/02042; G02B 6/0365
See application file for complete search history.

(56) References Cited

U.S. PATENT DOCUMENTS

| 4,715,679 A | 12/1987 | Bhagavatula |
|---|---|---|
| 4,889,404 A | 12/1989 | Bhagavatula et al. |

(Continued)

FOREIGN PATENT DOCUMENTS

| KR | 2012030725 A | 3/2012 |
|---|---|---|
| WO | 2010080952 A1 | 7/2010 |
| WO | 2011094400 A2 | 8/2011 |

OTHER PUBLICATIONS

Sakamoto, "ifferential Mode Delay Managed Transmission Line for Wide-band WDM-MIMO System", paper OM2D.1, OFC 2012.

(Continued)

*Primary Examiner* — Sung Pak
(74) *Attorney, Agent, or Firm* — Svetlana Z. Short (57) ABSTRACT

A fiber span comprising: a first optical fiber and a second optical fiber coupled to the first optical fiber, both fibers comprising the an inner core region with maximum refractive index delta, $\Delta_0 \leq 0.1\%$ and an outer radius $R_1 > 4.5$ µm, an outer core region with an outer radius $R_2$ and a minimum refractive index delta $\Delta_1$ and alpha value $\alpha \geq 5$, wherein $\Delta_1 < \Delta_0$, 5.5 µm $\leq R_2 - R_1 \leq 12$ µm; a cladding including a low index ring surrounding the core and a minimum refractive index delta $\Delta_{R,MIN} < \Delta_1$; and an outer cladding having $\Delta_{Outer-Clad} > \Delta_{R,MIN}$; the first fiber introducing differential mode delay $DMD_1$ for wavelengths between 1525 and 1570 nm such that $|DMD_1| \leq 100$ ps/km, and a first differential mode delay slope $DMDS_1$; the second fiber introducing differential mode delay $DMD_2$ for wavelengths between 1525 and 1570 nm such that $|DMD_2| \leq 100$ ps/km, and a second differential mode delay slope $DMDS_2$ that has an opposite sign from the first dispersion slope $DMDS_1$; wherein total differential mode delay provided by the first fiber in conjunction with the second fiber is $DMD_{tot} = DMD_1 + DMD_2$, and $-1.0$ ps/km $< DMD_{tot} < 1.0$ for all wavelengths between 1525 nm and 1570 nm.

24 Claims, 7 Drawing Sheets

(56) References Cited

U.S. PATENT DOCUMENTS

| | | |
|---|---|---|
| 6,418,256 B1 | 7/2002 | Danziger et al. |
| 7,095,940 B2 | 8/2006 | Hayami et al. |
| 7,426,327 B2 | 9/2008 | Mishra |
| 7,483,612 B2 | 1/2009 | Digiovanni et al. |
| 7,929,818 B1 | 4/2011 | Bickham et al. |
| 8,971,682 B2 | 3/2015 | Evans et al. |
| 9,151,889 B2 | 10/2015 | Dong et al. |
| 2002/0164140 A1 | 11/2002 | Lysiansky et al. |
| 2010/0103978 A1 | 4/2010 | Lee et al. |
| 2011/0188826 A1 | 8/2011 | Sillard et al. |
| 2012/0106909 A1 | 5/2012 | Bickham et al. |
| 2015/0333829 A1* | 11/2015 | Chen ............... H04B 10/60 398/143 |
| 2017/0205311 A1* | 7/2017 | Achten ............. G01M 11/338 |

OTHER PUBLICATIONS

F. Yaman, et al 10×112 Gb/s PDM-QPSK transmission over 5032 km in few-mode fibers Opt. Express. 18(20) 21342, 2010.

Single Mode Fiber Optics, Jeunhomme, pp. 39 44, Marcel Dekker, New York, 1990.

Lenahan, "Calculation of Modes in an Optical Fiber Using a Finite Element Method and Eispack," Bell Syst. Tech, J., vol. 62, No. 1, p. 2663, Feb. 1983.

* cited by examiner

OPTICAL FIBER SPAN WITH LOW DIFFERENTIAL MODE DELAY

This application claims the benefit of priority under 35 U.S.C. §119 of U.S. Provisional Application Ser. No. 62/288,843 filed on Jan. 29, 2016, the content of which is relied upon and incorporated herein by reference in its entirety.

BACKGROUND

The disclosure relates generally to optical fiber spans comprising optical fiber pairs and more specifically to optical fiber spans comprising optical fiber pairs for low DMD applications.

The explosive growth in the volume and variety of multi-media telecommunication applications continues to drive speed demands for internet traffic and motivate research in long-haul fiber-optic telecommunication.

Modern high-data-rate coherent transmission systems are already approaching information capacity limits. To exploit the full capacity in optical fiber, advanced multi-level modulation formats, such as QAM, and/or superchannel or OFDM systems will be needed. However these systems require higher signal-to-noise ratios (SNR) than are currently feasible. Fiber nonlinearities and fiber attenuation are the key performance limitations that prevent the higher SNRs from being achieved.

Compared to ordinary single-mode fibers, large effective area fibers are desirable because they can carry more optical power before the onset of nonlinear propagation impairments. However, to achieve extremely large effective areas (Aeff>>140 $\mu m^2$) with low bend loss, these large effective area fibers are often multimoded. Thus, they typically can introduce modal dispersion into the fiber spans. Modal dispersion is the spreading of pulses due to the different velocities of the modes. In such fibers, the light propagates in many different modes within in the fiber core. A "mode" is an allowable path for the light to travel through the fiber core. A multimode fiber allows many light propagation paths within its core, while a single-mode fiber allows only one light path. In a multimode fiber, the time it takes for light to travel through the fiber core is different for each mode, resulting in a spreading of the pulse at the output of the fiber. The difference in the time delay between modes is the called Differential Mode Delay (MID). Modal dispersion limits the bandwidth of optical fiber spans, limiting fiber span's information carrying capacity, i.e., how far a transmission system can operate at a specified bit error rate. Typically, as the fiber's effective area increases, deleterious nonlinear distortions decrease, but the number of supported modes, and hence the modal dispersion increases, making it difficult to achieve the desired system performance.

One solution is to utilize only large effective area fibers that have essentially no DMD over a wide wavelength range, but such fiber designs would be difficult and expensive to make in practice, and if such fibers are made they would have be made to very tight manufacturing tolerances.

No admission is made that any reference cited herein constitutes prior art. Applicant expressly reserves the right to challenge the accuracy and pertinence of any cited documents.

SUMMARY

Some of the embodiments of the disclosure relate to fiber span comprising (I) a first optical fiber, the first optical fiber comprising a core having
  (i) an inner core region with maximum refractive index delta, $\Delta_0 \leq 0.1\%$ and an outer radius $R_1$ wherein $R_1 > 4.5$ µm, and
  (ii) an outer core region with an outer radius $R_2$ and a minimum refractive index delta $\Delta_1$ and alpha value α wherein α≥5, wherein $\Delta_1 < \Delta_0$, 5.5 µm≤$R_2-R_1$≤12 µm; and
  an annular cladding surrounding the core, the cladding including
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$ relative to pure silica, such that $\Delta_{Outer-Clad} > \Delta_{R,MIN}$;
  said first fiber introducing differential mode delay $DMD_1$ for wavelengths between 1525 and 1570 nm, and a first differential mode delay slope $DMDS_1$; and
(II) a second optical fiber coupled to the first optical fiber, the second optical fiber comprising a core having:
  (i) an inner core region with maximum refractive index delta of the core, $\Delta_0 \leq 0.1\%$ wherein $R_1 > 4.5$ µm, and
  (ii) an outer core region with an outer radius $R_2$ and a minimum refractive index delta $\Delta_1$ and alpha value α wherein α≥5, where $\Delta_1 < \Delta_0$, and 5.5 µm≤$R_2-R_1$≤12 µm; and
  an annular cladding surrounding the core, the cladding including
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$ relative to pure silica, such that $\Delta_{Outer-Clad} > \Delta_{R,MIN}$; said second fiber introducing differential mode delay $DMD_2$ for wavelengths between 1525 nm and 1570 nm, and a second differential mode delay slope $DMDS_2$ that has an opposite sign from the first dispersion slope $DMDS_1$;
and wherein
total differential mode delay provided by said first fiber in combination with said second fiber is $DMD_{tot} = DMD_1 + DMD_2$, and $DMD_{tot}$ is less than 1.0 ps/km and more than −1.0 ps/km for all wavelengths between 1525 nm and 1570 nm.

Some of the embodiments of the disclosure relate to fiber span comprising:
(I) a first optical fiber, the first optical fiber comprising a core having
  (i) an inner core region with maximum refractive index delta, $\Delta_0 \leq 0.1\%$ and an outer radius $R_1$ wherein $R_1 > 4.5$ µm, and
  (ii) an outer core region with an outer radius $R_2$ and a minimum refractive index delta $\Delta_1$ and alpha value α wherein α≥5, wherein $\Delta_1 < \Delta_0$, 5.5 µm≤$R_2-R_1$≤12 µm; and
  an annular cladding surrounding the core, the cladding including
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$ relative to pure silica, such that $\Delta_{Outer-Clad} > \Delta_{R,MIN}$;
  the first fiber introducing differential mode delay $DMD_1$ for wavelengths between 1525 and 1570 nm such that 1 ps/km≤|DMD$_1$|≤100 ps/km, and a first differential mode delay slope DMDS$_1$; and (II) a second optical fiber coupled to the first optical fiber, the second optical fiber comprising a core having:
  (i) an inner core region with maximum refractive index delta of the core, $\Delta_0 \leq 0.1\%$ wherein R$_1$>4.5 μm, and
  (ii) an outer core region with an outer radius R$_2$ and a minimum refractive index delta $\Delta_1$ and alpha value α wherein α≥5, where $\Delta_1 < \Delta_0$, and 5.5 μm≤R$_2$−R$_1$≤12 μm; and
  an annular cladding surrounding the core, the cladding including
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$ relative to pure silica, such that $\Delta_{Outer-Clad} > \Delta_{R,MIN}$; the second fiber introducing differential mode delay DMD$_2$ for wavelengths between 1525 and 1570 nm such that 1 ps/km≤|DMD$_2$|≤100 ps/km, and a second differential mode delay slope DMDS$_2$ that has an opposite sign from the first dispersion slope DMDS$_1$;

and wherein
total differential mode delay provided by the first fiber in combination with the second fiber is DMD$_{tot}$=DMD$_1$+DMD$_2$, and DMD$_{tot}$ is less than 1.0 ps/km and more than −1.0 ps/km for all wavelengths between 1525 nm and 1570 nm.

Some of the embodiments of the disclosure relate to fiber span comprising:

(I) a first optical fiber, the first optical fiber comprising a core having:
  (i) an inner core region with a maximum refractive index delta $\Delta_0 \leq 0.1\%$, and an outer radius R$_1$ wherein R$_1$>4.5 μm, and
  (ii) an outer core region with an outer radius R$_2$ and a minimum refractive index delta $\Delta_1$ and alpha value α wherein α≥5, wherein $\Delta_1 < \Delta_0$, 5.5 μm≤R$_2$−R$_1$≤12 μm; and
  an annular cladding surrounding the core, the cladding including
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$ relative to pure silica, such that $\Delta_{Outer-Clad} > \Delta_{R,MIN}$;
  the first fiber introducing positive differential mode delay DMD$_1$ for all wavelengths between 1525 and 1570 nm such that 1 ps/km≤DMD$_1$≤100 ps/km, and a first differential mode delay slope DMDS$_1$; and (II) a second optical fiber coupled to the first optical fiber, the second optical fiber comprising
a core having:
  (i) an inner core region with maximum refractive index delta of the core, $\Delta_0 \leq 0.1\%$ wherein R$_1$>4.5 μm, and
  (ii) an outer core region with a minimum refractive index delta $\Delta_1$, where $\Delta_1 < \Delta_0$, 5.5 μm≤R$_2$−R$_1$≤12 μm, and alpha value α≥5; and
an annular cladding surrounding the core, the cladding including:
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$, such that $\Delta_{Outer-Clad} > \Delta_{R,MIN}$; the second fiber introducing negative differential mode delay DMD$_2$ for all wavelengths between 1525 and 1570 nm wherein −100 ps/km≤DMD$_2$≤−1 ps/km, and a second differential mode delay slope DMDS$_2$ that has an opposite sign from the first dispersion slope DMDS$_1$;

and wherein
total differential mode delay DMD$_{tot}$=DMD$_1$+DMD$_2$ provided by the first fiber in combination with the second fiber is DMD$_{tot}$=DMD$_1$+DMD$_2$ and DMD$_{tot}$ is less than 1.0 ps/km and more than −1.0 ps/km for all wavelengths between 1525 and 1570 nm.

Some of the embodiments of the disclosure relate to fiber span comprising:

(I) a first optical fiber, the first optical fiber comprising a core having:
  (i) an inner core region with a maximum refractive index delta $\Delta_0 \leq 0.1\%$, and an outer radius R$_1$ wherein R$_1$>4.5 μm, and
  (ii) an outer core region with an outer radius R$_2$ and a minimum refractive index delta $\Delta_1$ and alpha value α wherein α≥5, wherein $\Delta_1 < \Delta_0$, 5.5 μm≤R$_2$−R$_1$≤12 μm; and
  an annular cladding surrounding the core, the cladding including
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$ relative to pure silica, such that $\Delta_{Outer-Clad} > \Delta_{R,MIN}$;
  the first fiber introducing negative differential mode delay DMD$_1$ for all wavelengths between 1525 and 1570 nm such that −100 ps/km≤DMD$_1$≤−1 ps/km, and a first differential mode delay slope DMDS$_1$; and (II) a second optical fiber coupled to the first optical fiber, the second optical fiber comprising
a core having:
  (i) an inner core region with maximum refractive index delta of the core, $\Delta_0 \leq 0.1\%$ wherein R$_1$>4.5 μm, and
  (ii) an outer core region with a minimum refractive index delta $\Delta_1$, where $\Delta_1 < \Delta_0$, 5.5 μm≤R$_2$−R$_1$≤12 μm, and alpha value α≥5; and an annular cladding surrounding the core, the cladding including:
  (i) a low index ring surrounding the core and having a minimum refractive index delta $\Delta_{R,MIN}$, where $\Delta_{R,MIN} < \Delta_1$; and
  (ii) an outer cladding with a refractive index delta $\Delta_{Outer-Clad}$, such that $\Delta_{Outer-Clad} > \Delta_{R,MIN}$, the second fiber introducing positive differential mode delay DMD$_2$ for all wavelengths between 1525 and 1570 nm wherein 1 ps/km≤DMD$_2$≤100 ps/km, and a second differential mode delay slope DMDS$_2$ that has an opposite sign from the first dispersion slope DMDS$_1$;

and wherein
total differential mode delay DMD$_{tot}$=DMD$_1$+DMD$_2$ provided by the first fiber in combination with the second fiber is DMD$_{tot}$=DMD$_1$+DMD$_2$ and DMD$_{tot}$ is less than 1.0 ps/km and more than −1.0 ps/km for all wavelengths between 1525 and 1570 nm.

According to some embodiments the core is a Ge-free core. According to some embodiments the core comprises silica doped with chlorine (Cl). According to at least some of the embodiments, both the first and the second fibers have few-moded cores.

According to some embodiments the inner core region of the first optical fiber has the outer radius R$_1$>5 μm (e.g., between 5 and 12 μm); and (ii) the inner core region of the second optical fiber has the outer radius $R_1>5$ μm (e.g., between 5 and 12 μm). According to some embodiments the inner core region of the first optical fiber has the outer radius $R_1>6$ μm; and (ii) the inner core region of the second optical fiber also has the outer radius $R_1>6$ μm. According to some embodiments the inner core region of the first optical fiber has the outer radius $R_1>7$ μm; and (ii) the inner core region of the second optical fiber has the outer radius $R_1>7$ μm. According to some embodiments $R_1 \leq 10$ μm (e.g. 7 μm$\leq R_1 \leq 9$ μm) in both the first and the second optical fibers. According to some embodiments the first optical fiber has 6 μm$\leq R_2-R_1 \leq 11$ μm; and the second optical fiber also has 6 μm$\leq R_2-R_1 \leq 11$ μm. According to some embodiments the first optical fiber has 8 μm$\leq R_2-R_1 \leq 10$ μm; and the second optical fiber also has 8 μm$\leq R_2-R_1 \leq 10$ μm.

According to some embodiments the first optical fiber has the ratio of $R_2/R_1<2.2$, and the second optical fiber also has the ratio of $R_2/R_1<2.2$.

According to some embodiments the first fiber has a length $L_1$ and the second fiber has a length $L_2$ and wherein 10 km$\leq L_1+L_2 \leq 120$ km, for example 40 km$\leq L_1+L_2 \leq 100$ km.

In some embodiments the optical fiber and first the second optical fiber have fiber cores that are Ge-free silica based core and the fiber cores have step index profiles, the cores of each optical fiber having alpha value is greater than or equal to 5. In some embodiments the core's alpha value ($\alpha$) is $\geq 6$, for example $\geq 8$, for example $\alpha \geq 10$, or $\alpha \geq 12$. In some embodiments each of the cores has alpha values between 6 and 100, for example between 6 and 25.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to embodiments of optical fibers for use as long haul transmission fibers, examples of which are illustrated in the accompanying drawings. Whenever possible, the same reference numerals are used throughout the drawings to refer to the same or like parts.

Terminology

The following terminology will be used herein to describe the optical fibers, with some of the parameters being introduced and defined below in connection with the various example embodiments:

The term "refractive index profile," as used herein, is the relationship between the refractive index or the relative refractive index and the radius of the fiber.

The term "relative refractive index," also referred to as "refractive index delta", "relative refractive index delta" or as to "index delta", as used herein, is defined as:

$$\Delta(r)=[n(r)^2-n_{REF}^2)]/2n_{REF}^2,$$

where n(r) is the refractive index at radius r, unless otherwise specified. The relative refractive index is defined at 1550 nm unless otherwise specified. The reference index $n_{REF}$ is pure silica glass, the relative refractive index is represented by 4 and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "downdopant," as used herein, is a dopant which has a propensity to lower the refractive index of glass relative to pure, undoped $SiO_2$. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the term "differential mode delay" or DMD (ps/km) is defined herein as group delay difference between the $LP_{01}$ and $LP_{11}$ optical modes. As used herein, DMD=delay$_{01}$−delay$_{11}$, wherein delay$_{01}$ is the time it takes for the light in LP01 mode to propagate through 1 km of fiber length; and delay$_{11}$ is the time it takes for the light in LP11 mode to propagate through the same 1 km of fiber length.

As used herein, the "effective area" $A_{eff}$ of an optical fiber is the area of the optical fiber in which light is propagated and is defined as:

$$A_{eff}=2\pi\frac{\left(\int_0^\infty E^2 r\,dr\right)^2}{\int_0^\infty E^4 r\,dr},$$

where E is the electric field associated with light propagated in the fiber and r is the radius of the fiber. In the examples described herein. The effective area at the signal wavelength, of Aeff,s is determined at a wavelength of 1550 nm, unless otherwise specified.

The cutoff wavelength of a mode is the maximum wavelength at which a mode can propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the $LP_{11}$ mode. A mathematical definition of a theoretical cutoff wavelength is given in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding.

As used herein, the term "few moded fiber" refers to a fiber supporting the propagation of more than a single mode fiber but fewer modes than a normal multimode fiber (i.e., not greater than 20 LP modes). The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, Feb. 1983).

The bend resistance or bend performance of an optical fiber may be measured by the induced attenuation of light propagating through the fiber under prescribed test conditions. The bend performance of the optical fibers described herein is determined using the pin array bend test to compare the relative resistance of the optical fibers to bending. To perform this test, attenuation is measured for an optical fiber with essentially no induced bending loss. The optical fiber is then woven about the pin array and the attenuation is once again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the optical fiber conform to the portion of the periphery of the pins contacted by the fiber. The test pertains to macro-bend resistance of the optical fiber.

The term "α-profile" or "alpha profile," as used herein, refers to a relative refractive index profile, expressed in terms of Δ which is in units of "%", where r is the radius and which follows the equation, $$\Delta = \Delta_0 \left[1 - \left(\frac{r}{R_1}\right)^\alpha\right],$$

where $\Delta_0$ is the maximum relative refractive index, $R_1$ is the radius of the core, r is in the range $r_i \le r \le r_f$, Δ is as defined above, $r_i$ is the initial point of the α-profile, $r_f$ is the final point of the α-profile, and α is a real number exponent. As defined herein, for a graded index profile, the alpha value is less than $1.8 < \alpha < 2.3$, and a step index profile has an alpha value that is at least 5. The fiber embodiments described herein have step index profiles with α>5, for example α>6, or α>8, or even α≥10. The alpha value may be, for example, 6≤α≤100.

Unless otherwise specified herein, the above-referenced properties of the optical fiber disclosed herein and discussed below are measured or modeled at a signal wavelength of 1550 nm.

Figure 1:
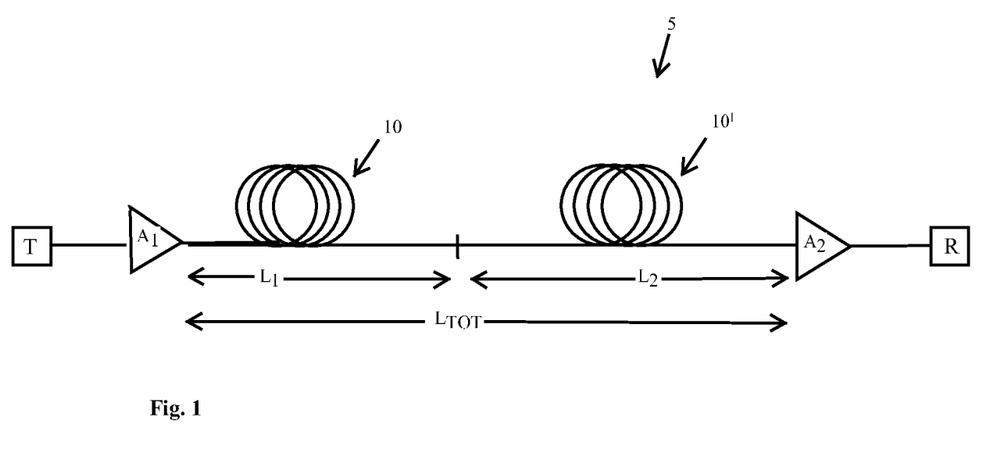
FIG. 1 illustrates schematically some exemplary embodiments of fiber spans.

As shown in FIG. 1, the embodiments of fiber spans 5 disclosed herein comprise at least two different fibers 10, 10'. According to at least some embodiments optical fibers are few moded optical fibers 10'. A span length is a distance between a receiver R and a transmitter T, or if optical amplifiers are used, the distance between two consecutive optical amplifiers A1 and A2. Preferably, according to the embodiments described herein the span length of an optical transmission system is 10 to 130 km, and in some embodiments 40 km to 120 km, for example about 50 km, 60 km, 75 km, 80 km, 100 km or therebetween. One of the optical fibers (e.g., optical fiber 10) causes differential mode delay (DMD) of an opposite sign but of about the same magnitude to that caused by the other optical fiber (e.g., optical fiber 10'), thus the DMD introduced by the first fiber 10 is compensated by the DMD introduced by the second fiber 10'. (As used herein, the term DMD when applied to an optical fiber refers to the group delay difference between the $LP_{01}$ and $LP_{11}$ modes in that fiber, because as these are the only two modes (mode families) intended to support propagation—i.e., these two modes can be used as information-carrying channels in fibers 10, 10'. Other optical modes, if exist, will be lossy, and are not utilized in the embodiments described herein.)

$DMD_1$ may be positive, and $DMD_2$ negative, i.e., in such embodiments 1 ps/km≤$DMD_2$≤100 ps/km and −100 ps/km≤$DMD_2$≤−1 ps/km for all wavelengths between 1525 and 1570 nm. Also, for example, $DMD_1$ may be negative, and $DMD_2$ positive, i.e., in such embodiments −100 ps/km≤$DMD_2$≤−1 ps/km and 1 ps/km≤$DMD_2$≤100 ps/km for all wavelengths between 1525 and 1570 nm.

For example, if the optical fiber 10 introduces differential mode delay $DMD_1$ into the fiber span, where $DMD_1$ is 1 ps/km≤$DMD_1$≤100 ps/km for all wavelengths between 1525 and 1570 nm, then the second fiber 10' introduces differential mode delay $DMD_2$ such that −100 ps/km≤$DMD_2$−1 ps/km, and such that $|DMD_1| \approx |DMD_2|$ throughout the wavelength band of interest. Thus, the optical fiber span 5 has a total differential mode delay differential mode delay $DMD_{tot}$, where $DMD_{tot}=DMD_1+DMD_2$, such that $|DMD_{tot}|\le 1$ ps/km, and preferably ≤0.5 ps/km for all wavelengths within the specified wavelength band. For example, in at least some embodiments −0.5 ps/km≤ $DMD_{tot}$≤0.5 for all wavelengths between 1525 nm and 1570 nm. Similarly, for example, if the optical fiber 10 introduces a negative differential mode delay $DMD_1$ into the fiber span, where $DMD_1$ is −100 ps/km≤$DMD_1$≤−1 ps/km for all wavelengths between 1525 and 1570 nm, then the second fiber 10' introduces positive differential mode delay $DMD_2$ such that 1 ps/km≤$DMD_2$≤100 ps/km, and such that $|DMD_1|\approx|DMD_2|$ throughout the wavelength band of interest and such that $|DMD_{tot}|\le 1$ ps/km. Preferably 0.9 $DMD_1$≤$|DMD_2|$≤1.1 $DMD_1$. In some embodiments 0.95 $DMD_1$≤$|DMD_2|$≤1.05 $DMD_1$, and in some embodiments 0.97 $DMD_1$≤$DMD_2$≤1.03$DMD_1$. We discovered that the practical difficulties associated with achieving good DMD cancellation increase with the increase in DMD of the constituent optical fibers forming the fiber pair of the span 5, because the manufacturing and deployment tolerances needed to achieve sufficient cancellation becomes very stringent. Consequently, the span length and the whole system reach are reduced. For this reason, in order to operate over longer fiber lengths, we designed our fibers such that each fiber 10, 10' has a DMD below 100 ps/km (in absolute value). In addition, we realized that if each fiber 10, 10' in the fiber pair has a DMD below 100 ps/km (in absolute value), it can enable longer span length and the length of each fiber used within the span, and this also minimizes the transmission losses due to fiber splicing. For example, as shown in FIG. 1, and described above, the embodiments of fiber spans 5 disclosed herein comprise two different fibers 10, 10' (also referred to herein as a fiber pair). In at least some embodiments, the first fiber 10, has a length $L_1$ and the second fiber 10' has a length $L_2$ and 10 km$\leq L_1+L_2 \leq$120 km (e.g., 10 km$\leq L_1+L_2 \leq$100 km, or 50 km$\leq L_1+L_2 \leq$120 km, or 40 km$\leq L_1+L_2 \leq$100 km, or 50 km$\leq L_1+L_2 \leq$100 km) and in some embodiments 80 km$\leq L_1+L_2 \leq$120 km, or 80 km$\leq L_1+L_2 \leq$100 km. In the exemplary embodiments described herein, $0.9 \leq L_1/L_2 \leq 1.15$, $0.9 \leq L_1/L_2 \leq 1.15$, for example $0.95 \leq L_1/L_2 \leq 1.1$. In some embodiments the total length $L_{TOT}$ of the fiber span is between 50 km and 120 km, and each fiber has a length of at least 10 km, preferably at least 22.5 km, Preferably each span utilizes no more than two fibers per span—i.e., each span comprises only two fiber 10, 10'. In some exemplary embodiments 0.95 $DMD_1 \leq DMD_2 \leq 1.05$ $DMD_1$, and the absolute value of DMD slope (ps/nm/km) at the operating wavelength (e.g., 1550 nm) of the optical fiber 10 is within 5% of that of the optical fiber 10' (but the two slopes have opposite signs). In some exemplary embodiments 0.97 $DMD_1 \leq |DMD_2| \leq 1.03$ $DMD_1$, and, the absolute value of DMD slope (ps/nm/km) at the operating wavelength (e.g., 1550 nm) of the optical fiber 10 is within 5% of that of the optical fiber 10' and $0.95 \leq L_1/L_2 \leq 1.1$. Preferably, as shown in FIG. 1 the fiber span 5 has no more than two DMD compensating fibers (i.e., only 1 optical fiber 10 and only one optical fiber 10').

In some embodiments, for ease of deployment, the optical fiber 10 is comprised of shorter segments of fiber 10 that are spliced together during cabling or deployment in the field. These segments of fiber 10 are substantially identical to one another (i.e., the segments of the optical fiber 10 have essentially the same effective area, and the same sign for DMD). Similarly, for ease of deployment, the optical fiber 10' may be comprised of shorter segments of fiber that are spliced together during cabling or deployment in the field, and the spliced segments of fiber 10' are substantially identical to one another (i.e., the segments of the optical fiber 10' have essentially the same effective area (at the same wavelength) and the same sign for DMD).

In some embodiments −1 ps/km$\leq DMD_{tot} \leq$1 ps/km for all wavelengths between 1525 nm and 1570 nm. In some embodiments −0.8 ps/km$\leq DMD_{tot} \leq$0.8 ps/km for all wavelengths between 1525 nm and 1570 nm. In some embodiments −0.5 ps/km$\leq DMD_{tot} \leq$0.5 ps/km, or even −0.25 ps/km$\leq DMD_{tot} \leq$0.25 ps/km for all wavelengths between 1525 nm and 1570 nm, and in some embodiments −0.15 ps/km$\leq DMD_{tot} \leq$0.15 ps/km for all wavelengths between 1525 nm and 1570 nm. According to at least some embodiments $DMD_{tot}$ is positive for at least some of the wavelengths in the 1525 nm and 1570 nm range and is negative for at least some of wavelengths in the 1525 nm and 1570 nm range. According to at least some embodiments $DMD_{tot}$=0 ps/km at least one wavelength situated between 1540 nm and 1560 nm. The plot of $DMD_{tot}$ vs. wavelength may be approximately linear or approximately parabolic, so that it may cross the zero value at one or more points within the wavelengths of interest (i.e., there are one or two points where the plot of $DMD_{tot}$ crosses the horizontal axis and $DMD_{tot}$ is zero). According to at least some of the exemplary embodiments, $DMD_{tot}$=0 ps/km at least a wavelength situated between 1540 nm and 1560 nm.

In the embodiments described herein, one fiber has DMD that has a positive slope (i.e., its DMD increases as the wavelength increases), and the other fiber has a DMD that has a negative slope (i.e., its DMD decreases as the wavelength increases). For example if the optical fiber 10 has a positive DMD slope (i.e., $DMDS_1$>0), then optical fiber 10' has a negative DMD slope (i.e., $DMDS_2$<0). Similarly if the optical fiber 10 has a negative DMD slope ($DMDS_1$<0), then optical fiber 10' has a positive DMD slope (i.e., $DMDS_2$>0).

Figure 2:
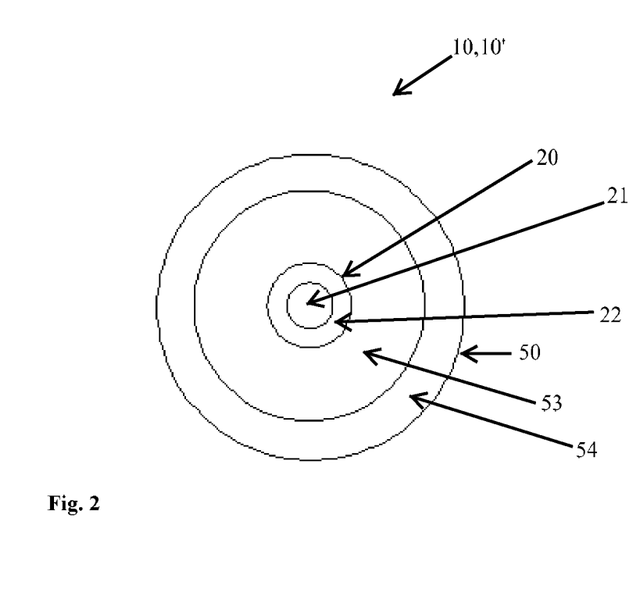
FIG. 2 is a schematic cross-sectional view of one embodiment of an optical fiber that can be utilized in the fiber span of FIG. 1.
Figure 3:
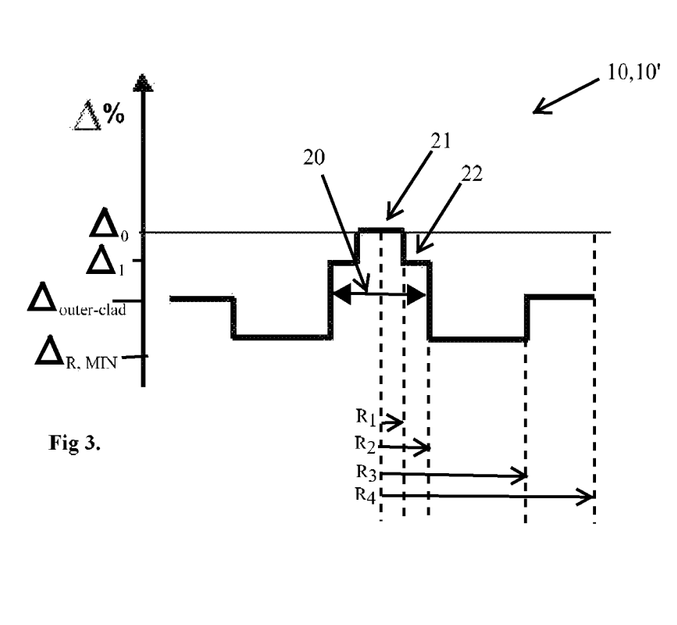
FIG. 3 illustrates schematically the refractive index delta profile of the exemplary optical fiber embodiment of FIG. 2.

FIG. 2 is a cross sectional view of optical fiber ("fiber") 10, 10' according to the embodiments described herein. The various example embodiments of fiber 10, 10' are now described below with respect to cross-sectional view of the fiber and plots of the corresponding refractive index profile(s). FIG. 3 illustrates schematically the refractive index profile(s) of FIG. 2 fibers 10 and 10'. As can be seen from FIGS. 2 and 3, the fiber embodiments 10, 10' have a step-index core 20. The core 20 includes a central, inner core region 21 and an annular outer core region 22 that is adjacent to and directly surrounds the inner core region. The inner core region 21 has higher refractive index than the outer core region 22. The parameters (refractive index deltas and radii) of the inner core region and the outer core region are chosen such that the differential mode delay introduced by one fiber (e.g., fiber 10') compensates for the differential mode delay introduced by the other fiber (e.g., fiber 10). Preferably, fiber embodiments 10, 10' have a maximum refractive index delta of the core, $\Delta_0$ in % measured relative to pure $SiO_2$ is −0.02%$\leq \Delta_0 \leq$0.1%, and fiber cores 20 are Ge-free which helps the fibers to have very low attenuation.

According to some exemplary embodiments the optical fiber 10, 10' comprises: (I) a Ge-free silica based core 20 having
  (i) an inner core region 21 with the maximum refractive index delta $\Delta_0$ wherein −0.02%$\leq \Delta_0 \leq$0.1%; a radius $R_1$>4.5 µm (e.g., $R_1 \geq$5 µm, $R_1 \geq$6 µm, or $R_1 \geq$7 µm), and
  (ii) an outer core region 22 with an radius $R_2$, and the refractive index delta $\Delta_1$, where $\Delta_0$>$\Delta_1$, and −0.05%$\leq \Delta_1$<0, and alpha value α wherein α$\geq$5 (for example, 12 or 15, or 20, or 25, or therebetween); such that the fiber has an effective area Aeff,s of $LP_{01}$ mode such that at a wavelength λs, 140 µm²<Aeff<325 µm² where λs is situated in the wavelength range of 1555 nm to 1545 nm (e.g., =1550 nm); and
(II) an annular cladding 50 surrounding the core 20, the cladding 50 comprising
  (i) a low index ring 53 surrounding the core and having a minimum refractive index delta $\Delta_{RMIN}$, wherein and $\Delta_{R,MIN}$<$\Delta_1$ and (b) $\Delta_{R,MIN} \leq$−0.30% measured relative to pure $SiO_2$ (e.g., $\Delta_{R,MIN} \leq$−0.35%, or −0.4%$\leq \Delta_{R,MIN} \leq$−0.30%, or −0.4%$\leq \Delta_{R,MIN} \leq$−0.33%); and
  (ii) an outer cladding 54 surrounding the low index ring 53, the outer cladding 54 having a refractive index delta $\Delta_{Outer-Clad}$ relative to pure silica, such that $\Delta_{Outer-Clad}$>$\Delta_{R,MIN}$; and the difference between the relative refractive index of the core $\Delta_0$.

Note: the first optical fiber 10 and the second optical fiber 10' are not single mode fibers.

Preferably, the core 20 of fibers 10 and 10' is a segmented core (with two segments 21, 22) with a step refractive index profile (i.e., core 20 is not a graded index core), and according to at least some embodiments, 5.5 µm$\leq R_2-R_1 \leq$12 µm. In some embodiments the difference between radii $R_2$ and $R_1$ in the optical fiber 10 and/or 10' is 6 µm≤$R_2$–$R_1$≤11 µm. In some embodiments 7 µm≤$R_2$–$R_1$≤11 µm, or 7 µm≤$R_2$–$R_1$≤10 µm. In some embodiments 8 µm≤$R_2$–$R_1$≤10 µm or even 8 µm≤$R_2$–$R_1$≤9.5 µm. In some embodiments $R_2$ is about 10 µm to 25 µm. In some embodiments 12 µm≤$R_2$≤20 µm, for example, 13 µm, 14 µm, 15 µm, 16 µm, 17 µm, 18 µm, 19 µm, or therebetween. For example, in some embodiments $R_2$ is 15 µm≤$R_2$18 µm.

Various embodiments will be further clarified by the following examples.

Tables 1A and 1B, below, provide parameters for four exemplary fiber spans comprising eight different fiber embodiments (fiber examples 1-8).

The optical fiber embodiments 10, 10' depicted in Tables 1A-1B and shown schematically in FIGS. 2 and 3 each comprise a Ge-free silica based core 20, a cladding 50, and at least one coating 60 (not shown) surrounding the glass cladding 50. In these embodiments the core index profiles are step index profiles with α>10, and as described above each of the cores 20 includes an inner core region 21 and an outer core region 22. The outer core region 22 has a lower refractive index than that of the inner core region. The outer radius of the inner core region 21 is $R_1$. Preferably, in both fibers 10 and 10' $R_1$>4.5 µm, to help provide the absolute value of DMD at or below 100 ps/km, and even more preferably $R_1$≥5 µm and ≤12 µm. The outer radius of the outer core region 20 is $R_2$. Thus, the outer radius of the core 20 is also $R_2$. Each of the claddings 50 in fibers 10,10' includes a moat (a low refractive index ring, also referred to herein as a low index ring)) 53, and outer cladding 54. The outer radius of the cladding 50 is $R_{outer}$. In the exemplary embodiments described herein $R_{outer}$=62.5 µm. In alternative embodiments $R_{outer}$ may be different, for example between 62.5 µm and 125 µm.

Preferably, according to at least some embodiments, the relative refractive index profile of the optical fibers 10, 10' are structured to provide attenuation of less than 0.18 dB/km (e.g., 0.155 dB/km to 0.178 dB/km) at the 1550 nm wavelength. For example, in some embodiments the attenuation is not greater than 0.168 dB/km, e.g., 0.155 dB/km to 0.168 dB/km) at the 1550 nm wavelength.

The central core region 21 may be pure silica, or silica doped with Cl, and has an index of refraction that is approximately that of pure silica. The relative refractive index (also referred to herein as refractive index delta) of the core region 21 is, for example, −0.02%≤$\Delta_0$≤0.1%; relative to pure silica. In some embodiments the radius $R_1$ for each of the fibers 10 and 10' is about 4.5 µm to 12 µm, e.g., 4.5 µm to 10 µm or 5 µm to 12 µm, or 5.5 µm to 12 µm. In some embodiments, for example, the radius $R_1$ for both fibers 10 and 10' is in the range of 4.5 µm and 9.5 µm, or 5.5 µm to 9.5 µm, or 6 µm to 9.5 µm. In some embodiments at least one of the fibers (10 or 10') has the inner core radius $R_1$ that is greater than 6 µm, more preferably greater 7 µm, for example greater 8 µm, or greater 8.5 m. In some embodiments, for example, the radius $R_1$ for each of the fibers 10 and 10' within the fiber span 5 is in the range of 7 µm and 9.5 µm.

In at least some exemplary embodiments both fibers 10, 10' in the fiber pair forming a fiber span 5 have a ratio of $R_2/R_1$≤2.2, for example $R_2/R_1$≤2, and in some embodiments both fibers in the fiber pair n have a ratio of $R_2/R_1$≤2.19. In at least some embodiments both fibers in the fiber span (i.e., both fiber 10 and fiber 10') have the ratio of $R_2/R_1$≤2.17. This helps to keep DMD contributions of both fibers to or below 100 ps/km.

According to at least some embodiments the $R_1$ value of the optical fiber 10 does not equal to the $R_1$ value of the optical fiber 10' (i.e., the outer radii of the inner cores are dis-similar.) According to at least some embodiments the difference in $R_1$ values of optical fibers 10 and 10' is at least 1 µm (e.g., 1 µm to 2.25 µm, or 1 µm to 1.5 µm). For example, according to some embodiments the difference in $R_1$ values of optical fibers 10 and 10' is at least 1.25 µm, and in some embodiments about 1.3 µm, i.e., in these exemplary embodiments $R_1$ value of the optical fiber 10 is not equal to the $R_1$ value of the optical fiber 10'. According to at least some embodiments the difference in radii $R_1$ between optical fibers 10 and 10' is 1.2 µm to 2 µm, for example 1.25 µm to 1.5 µm.

As described above, the core 20 is surrounded by the cladding 50. At least a portion of the cladding 50 (e.g., the low index ring 53) is down-doped relative to the core 20 (and relative to pure silica), and contains fluorine (F) or boron (B) as a downdopant. In the exemplary embodiments described herein, the downdopant is F1. The core 20 may also include chlorine (e.g. <0.05 wt %), or some alkali, for example potassium (e.g., <0.05 wt %, or 20 to 1000 ppm by weight) to control its viscosity.

The low index ring 53 (also referred to as a moat herein) of the cladding 50 has a relative refractive index delta ($\Delta_{R,MIN}$) and an outer radius $R_3$ and is directly adjacent to the core 20. As described herein, a moat is a low refractive index cladding region situated between a core and an outer cladding region, and is the lowest refractive index portion of the cladding. The low index ring (moat) 53 can be made of glass doped with an index decreasing dopant such as F, or B. In the embodiments of Tables 1A, 1B the low index ring 53 comprises silica doped with F. The outer cladding layer 54 has an outer radius $R_{outer}$ and a higher maximum index of refraction than that of the low index ring 53, the outer cladding surrounds and is in directly contact with the low index ring 53. Preferably $\Delta_0$>$\Delta_{cladMAX}$>$\Delta_{R,MIN}$, where is the $\Delta_{cladMAX}$ is maximum refractive index delta of the cladding 50. In the exemplary embodiments of FIG. 3, $\Delta_0$>$\Delta_1$>$\Delta_{R,MIN}$ and $\Delta_{Outer-Clad}$>$\Delta_{R,MIN}$. In the exemplary embodiment of FIG. 3 the relative refractive index delta ($\Delta_{outer-clad}$) of the outer cladding 54 is −0.275%, but it can be higher or lower than −0.275%. In the embodiment of FIG. 3 the core alpha is at least 5, for example 6≤α≤50. For example, in fiber embodiments of Tables 1A, 1B the value of the core's alpha parameter is at least 10 (α≥10.)

Table 1A and 1B illustrate the properties of four embodiments of exemplary fiber spans, each comprising of optical fiber pairs 10 and 10'. Table 1A provides refractive index deltas and the outer radii for each fiber region, while Table 1B discloses the effective areas of the fibers at the signal wavelength of 1550 nm, the performance of each fiber, and the performance of four fiber span that include matched fiber pairs 10, 10'. In the embodiments of Tables 1A, 1B absolute value of DMD of each fiber 10, 10' is <75 ps/km, for example 30≤|$DMD_1$|≤75 ps/km, and 30≤|$DMD_2$|≤75 ps/km.

TABLE 1A

| Fiber span | fiber | Fiber's Refractive index deltas (%) $\Delta_0$; $\Delta_1$; $\Delta_{R,MIN}$; $\Delta_{Outer-Clad}$ | Inner core radius $R_1$ | core radius $R_2$ | outer core region radial width $(R_2 - R_1)$ | $\Delta_0 - \Delta_1$ | $R_2/R_1$ | ring radius $R_3$ | ring radius width $R_3 - R_2$ |
|---|---|---|---|---|---|---|---|---|---|
| 1 | 1 | 0.08; −0.037; −0.37; −0.275 | 8.47 | 17.73 | 9.26 | 0.117 | 2.09 | 32.73 | 15.00 |
|   | 2 | 0.08; −0.004; −0.37; −0.275 | 7.19 | 15.44 | 8.25 | 0.084 | 2.15 | 30.44 | 15.00 |
| 2 | 3 | 0.08; −0.005; −0.37; −0.275 | 7.14 | 15.63 | 8.49 | 0.085 | 2.19 | 30.63 | 15.00 |
|   | 4 | 0.08; −0.039; −0.37; −0.275 | 8.56 | 17.61 | 9.05 | 0.119 | 2.06 | 32.61 | 15.00 |
| 3 | 5 | 0.08; −0.037; −0.37; −0.275 | 8.48 | 17.72 | 9.24 | 0.12 | 2.09 | 32.72 | 15.00 |
|   | 6 | 0.08; −0.004; −0.37; −0.275 | 7.19 | 15.47 | 8.28 | 0.08 | 2.15 | 30.47 | 15.00 |
| 4 | 7 | 0.08; −0.005; −0.37; −0.275 | 7.15 | 15.6 | 8.47 | 0.09 | 2.18 | 30.62 | 15.00 |
|   | 8 | 0.08; −0.039; −0.37; −0.275 | 8.55 | 17.62 | 9.07 | 0.12 | 2.06 | 32.62 | 15.00 |

TABLE 1B

| Fiber span | fiber | Fiber's effective area Aeff (µm²) at 1550 nm | DMD (ps/km) at 1550 nm | Slope (ps/nm/km) at 1550 nm | LP01 pin array (dB)* at 1550 nm | LP02 cutoff (µm) | LP11 cutoff (µm) |
|---|---|---|---|---|---|---|---|
| 1 | 1 | 258 | 50.0 | 1.0 | 0.25 | 2.05 | 3.00 |
|   | 2 | 258 | −50.0 | −1.0 | 0.29 | 2.17 | 3.15 |
| 2 | 3 | 258 | 50.0 | −1.0 | 0.3 | 2.05 | 3.00 |
|   | 4 | 258 | −50.1 | 1.0 | 0.24 | 2.17 | 3.15 |
| 3 | 5 | 315 | 40.2 | 0.966 | 0.27 | 2.55 | 3.69 |
|   | 6 | 188 | −39.8 | −1.009 | 0.78 | 1.55 | 2.27 |
| 4 | 7 | 146 | 41.3 | −0.908 | 2.61 | 1.223 | 1.77 |
|   | 8 | 262 | −40.2 | 0.97 | 0.3 | 2.17 | 3.15 |

It is noted that although the fibers 10 and 10' in each of the fiber span of Table 1A have identical $\Delta_0$ value, this is not necessary. Other embodiments the two fibers 10 and 10' in the fiber pair do not have to have matched (identical) $\Delta_0$ values. It is also noted that most of the optical fibers 10, 10' of Table 1A, 1B may support additional modes in the C band besides the LP01 and LP11, such as the LP02 and LP21 modes. However, these additional modes are predicted to have very large effective areas (600 µm² to 800 µm², or larger), low effective index, and very high loss, and thus cannot support transmission over the long distances and are ignored herein for the purposes of DMD calculation.

The relative refractive index delta of the outer cladding 54 of the optical fibers 10, 10' of Table 1A, 1B can be changed to influence mode cutoffs without significantly impacting the effective areas. (Note: the cutoffs wavelengths of for the fibers can be easily modified by changing $\Delta_{Outer-Clad}$ As the $\Delta_{Outer-Clad}$ increases, the cutoff wavelength decreases. The more negative is the value of $\Delta_{Outer-Clad}$, the larger is the cutoff wavelength. The pin array bend loss value is also impacted by outer cladding's delta.)

Figure 4:
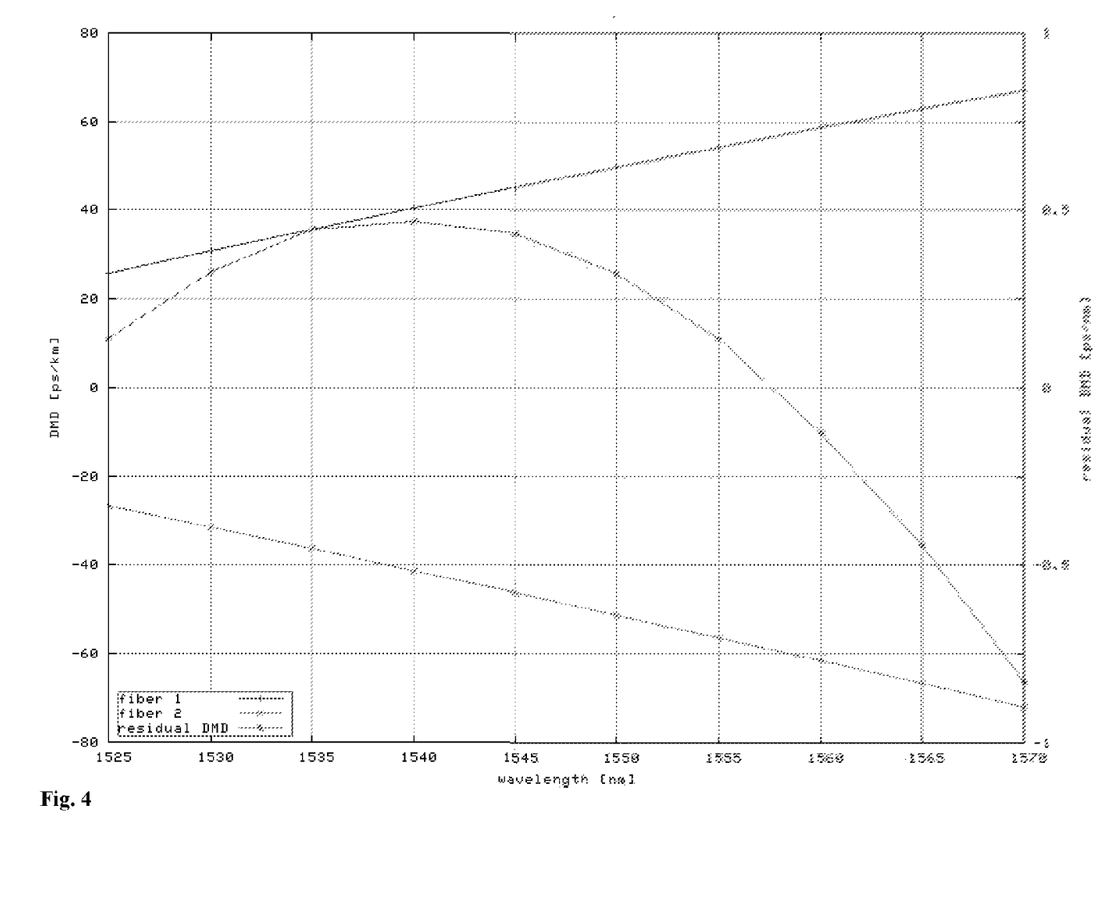
FIG. 4 is a plot of DMD vs. wavelength for the optical fibers of the first optical fiber span embodiment, as well as for the entire fiber span.

FIGS. 4-7 depict the modeled performance of fiber spans 1, 2, 3, and 4 respectively. They provide the DMD contributed by each fiber vs. wavelength, as well as the residual differential group delay ($DMD_{tot}$) vs. wavelength associated with each optical fiber pair 10, 10'. For example, FIG. 4 corresponds to the optical fiber span #1. This figure shows that the optical fiber 10 (fiber #1 in Tables 1A,1B) has DMD that is positive in value, and that DMD of the fiber increases from a minimum value of about 25 ps/km (at 1525 nm) to a maximum value of about 65 ps/km-70 ps/km (at 1570 nm). Thus, the differential mode delay slope (also referred to herein as DMD slope herein) of the optical fiber 10 corresponding to exemplary optical fiber #1 is positive (i.e., in this embodiment $DMDS_1$ is positive). FIG. 4 also depicts that the optical fiber 10' (fiber #2 in Table 1A, 1B) has negative DMD slope, and that DMD decreases from a minimum value of about 27 ps/km at the 1525 nm wavelength to about −72 ps/km at the 1570 nm wavelength. Thus, the DMD slope of optical fiber 10' (i.e., in this embodiment $DMDS_2$) corresponding to the exemplary optical fiber #2 is negative. That is, DMD slopes of fiber 10' and 10 have opposite signs. FIG. 4 also illustrates residual deferential mode delay ($DMD_{tot}$) of the fiber span #1 that comprises fibers #1 and #2. As seen in FIG. 4, the residual deferential mode delay of the optical fiber span #1 depicted in Tables 1A, 1B increases from about 0.125 ps/km (at 1525 nm) to about 0.5 ps/km (at 1540 nm) and then decreases to about −0.8 ps/km (at 1570 nm) i.e., in this embodiment −0.8 ps/km≤$DMD_{tot}$≤0.8 ps/km, thus this embodiment satisfies the requirement −1 ps/km≤$DMD_{tot}$≤1 ps/km over the entire C-band wavelength range (1525 nm-1570 nm). The residual differential mode delay of the optical fiber span #1 is zero ($DMD_{tot}$=0) at a wavelength of about 1557 nm.

Figure 5:
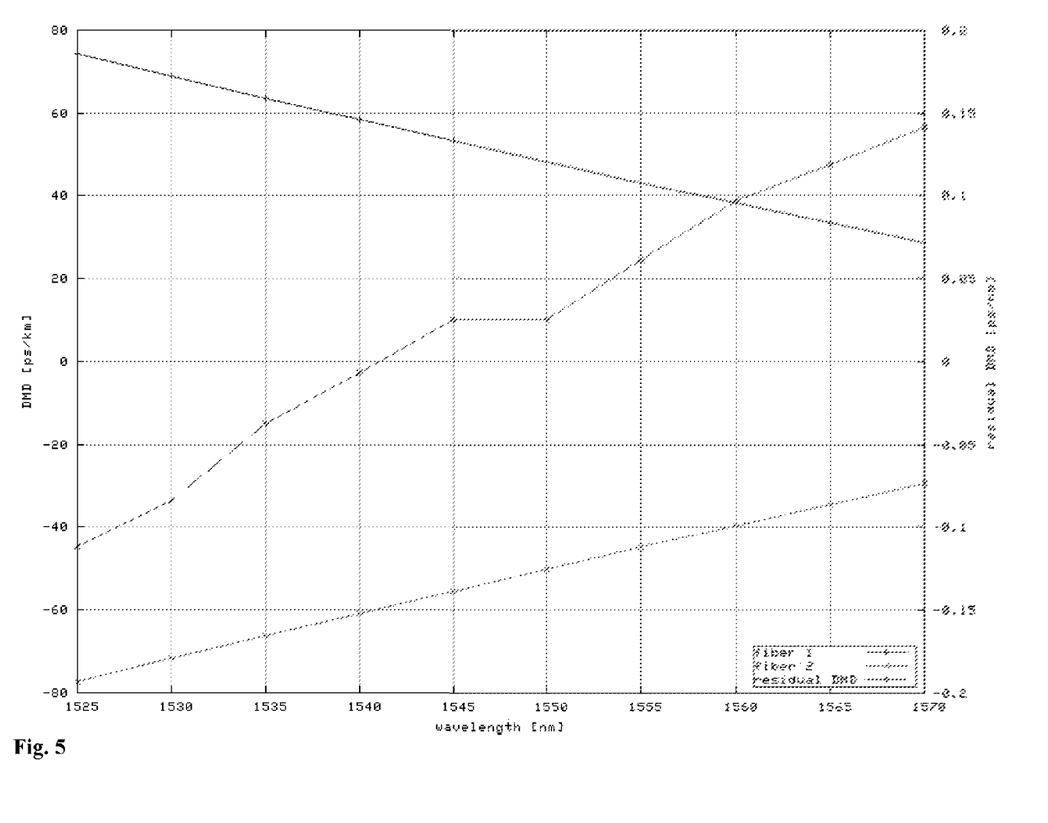
FIG. 5 is a plot of DMD vs. wavelength for the optical fibers of the second optical fiber span embodiment, as well as for the entire second fiber span.

FIG. 5 corresponds to the optical fiber span #2. This figure shows that the optical fiber 10 (fiber #3 in Tables 1A,1B) has DMD that is positive in value, and that DMD of fiber #3 decreases from a maximum value of about 75 ps/km at a 1525 nm wavelength to less than 30 ps/km at 1570 nm wavelength. Thus, the DMD slope of the optical fiber 10 corresponding to exemplary optical fiber #3 is negative. FIG. 5 also depicts that the optical fiber 10' (fiber #4 in Table 1A,1B) has negative DMD, and that DMD changes from a minimum value of about −80 ps/km at about 1525 nm wavelength to about −30 ps/km at the 1570 nm wavelength. Thus, the DMD slope of optical fiber 10' corresponding to the exemplary optical fiber #4 is positive. That is, DMD slopes of fiber 10' and 10 have opposite signs. FIG. 5 also illustrates residual deferential mode delay ($DMD_{tot}$) of the fiber span #2 that comprises fibers #3 and #4. As seen in FIG. 5, the residual deferential mode delay of the optical fiber span #2 depicted in Tables 1A, 1B varies between about −0.125 ps/km (at 1525 nm) wavelength and about 0.14 ps/km (at 1570 nm) i.e., in this embodiment −0.15 ps/km≤ $DMD_{tot}$≤0.15 ps/km over the entire C-band range (1525 nm-1570 nm wavelength range). The residual differential mode delay of the optical fiber span #1 is zero at a wavelength of about 1553 nm.

Figure 6:
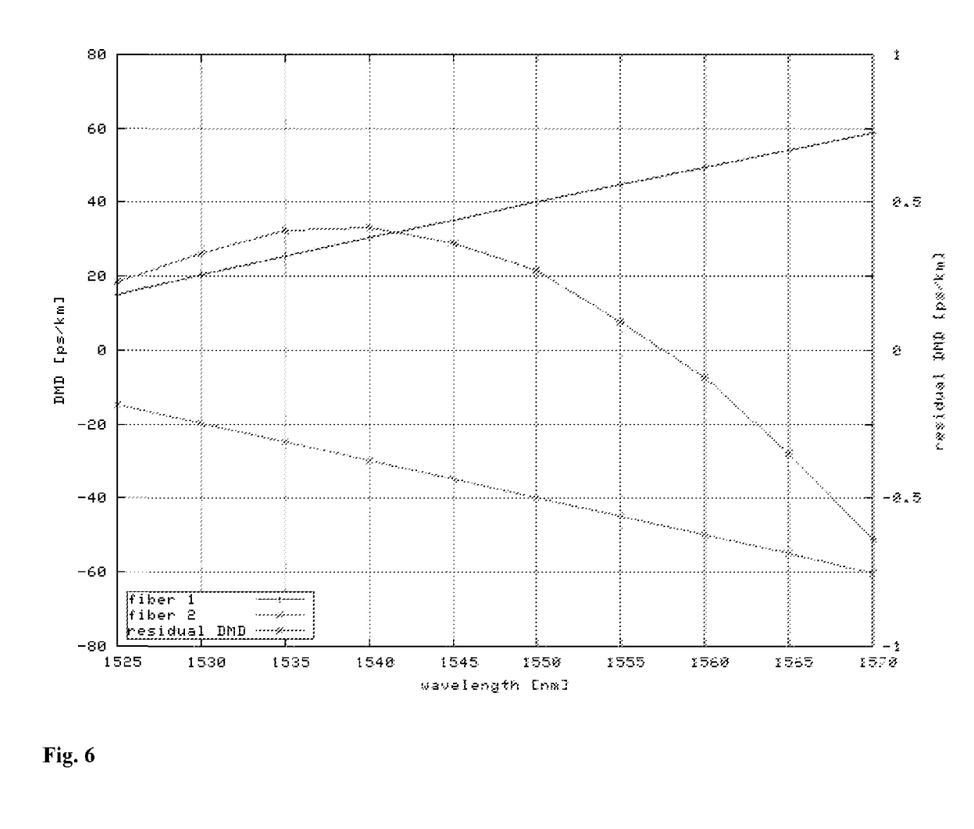
FIG. 6 is a plot of DMD vs. wavelength for the optical fibers of the third optical fiber span embodiment, as well as for the entire third fiber span.

FIG. 6 corresponds to the optical fiber span #3. This figure shows that the optical fiber 10 (fiber #5 in Tables 1A,1B) has DMD that is positive, and that increases from a maximum value of about 15 ps/km at 1525 nm wavelength to about 60 ps/km at 1570 nm wavelength. Thus, the DMD slope of the optical fiber 10 that corresponds to the exemplary fiber 5 is positive. FIG. 6 also depicts that the optical fiber 10' (fiber 6 in Table 1A,1B) has DMD that is negative in value, and that it changes from about −15 ps/km at about 1525 nm wavelength to about −60 ps/km at 1570 nm wavelength. That is, the DMD slope of the optical fiber 10 (exemplary fiber #6) of this embodiment negative. Thus DMD slopes of optical fiber 10 and optical fiber 10' have the opposite signs. FIG. 6 also illustrates residual deferential mode delay ($DMD_{tot}$)) of the fiber span #3 that comprises fibers #1 and #2. As seen in FIG. 6, the residual deferential mode delay of the optical fiber span #3 depicted in Tables 1A, 1B is −0.5 ps/km≤$_{tot}$ DMD≤0.75 ps/km over the entire C-band range (1525 nm-1570 nm wavelength range). The residual differential mode delay of the optical fiber span #1 is zero at a wavelength of about 1558 nm.

Figure 7:
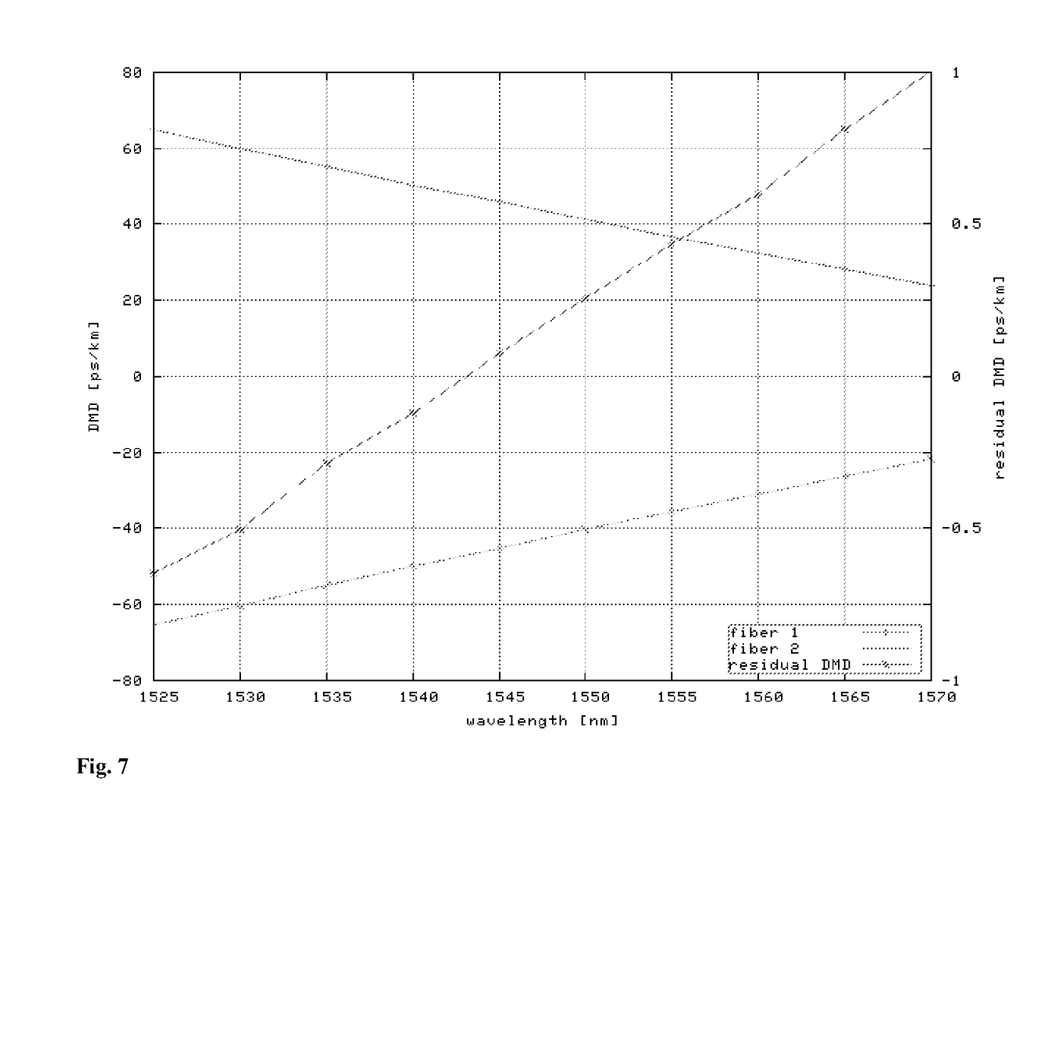
FIG. 7 is a plot of DMD vs. wavelength for the optical fibers of the forth optical fiber span embodiment, as well as DMD of the entire fourth fiber span.

FIG. 7 corresponds to the optical fiber span #4. This figure shows that the optical fiber 10 (fiber #7 in Tables 1A,1B) has DMD that is positive in value, and that DMD of the fiber decreases about 65 ps/km (at 1525 nm) to about 25 ps/km (at 1570 nm). Thus, the DMD slope of the optical fiber 10 corresponding to exemplary fiber 7 is negative. FIG. 7 also depicts that the optical fiber 10' (fiber #8 in Table 1A,1B) has negative DMD, and that DMD changes from about −65 ps/km at the 1525 nm wavelength to about −20 ps/km at the 1570 nm wavelength. That is, the DMD slope of optical fiber 10' corresponding to the exemplary fiber 8 is positive. Thus, DMD slopes of fiber 10' and 10 have opposite signs. FIG. 7 also illustrates residual deferential mode delay ($DMD_{tot}$) of the fiber span #4 that comprises fibers #7 and #8. As seen in FIG. 7, the residual deferential mode delay of the optical fiber span #4 depicted in Tables 1A, 1B changes from about −0.65 ps/km (at 1525 nm) to about 1 ps/km at 1570 nm—i.e., this embodiment satisfies the requirement −1 ps/km≤$DMD_{tot}$≤1 ps/km over the entire C-band wavelength range (1525 nm-1570 nm). The residual differential mode delay of the optical fiber span #4 is zero ($DMD_{tot}$=0) at a wavelength of about 1543 nm.

Thus, according to some embodiments a fiber span 5 comprises:
(I) a first optical fiber 10, the first optical fiber 10 comprising a core 20 having
  (i) an inner core region 21 with maximum refractive index delta, $\Delta_0$≤0.1% and an outer radius $R_1$ wherein $R_1$>4.5 μm, and
  (ii) an outer core region 22 with an outer radius $R_2$ and a minimum refractive index delta $\Delta_1$ and alpha value α wherein α≥5, wherein $\Delta_1$<$\Delta_0$, 5.5 μm≤$R_2$−$R_1$≤12 μm; and
    an annular cladding 50 surrounding the core 20, the cladding including
    (i) a low index ring 53 surrounding the core and having a minimum refractive index delta $\Delta_{R,MIN}$, where $\Delta_{R,MIN}$<$\Delta_1$; and
    (ii) an outer cladding 54 with a refractive index delta $\Delta_{Outer-Clad}$ relative to pure silica, such that $\Delta_{Outer-Clad}$>$\Delta_{R,MIN}$;
  the first fiber 10 introducing a differential mode delay $DMD_1$ for all wavelengths between 1525 and 1570 nm wherein 1 ps/km≤|$DMD_1$|≤100 ps/km, and a first differential mode delay slope $DMDS_1$; and
(II) a second optical fiber 10' coupled to the first optical fiber, the second optical fiber 10' comprising a core 20 having:
  (i) an inner core region 21 with maximum refractive index delta of the core, $\Delta_0$≤0.1% wherein $R_1$>4.5 μm and an outer radius $R_1$ wherein $R_1$>4.5 μm, and
  (ii) an outer core region 22 with an outer radius $R_2$ and a minimum refractive index delta $\Delta_1$ and alpha value α wherein α≥5, where $\Delta_1$<$\Delta_0$, and 5.5 μm≤$R_2$−$R_1$≤12 μm; and
    an annular cladding 50 surrounding the core 20, the cladding 50 including
    (i) a low index ring 53 surrounding the core 20 and having a minimum refractive index delta $\Delta_{RMIN}$, where $\Delta_{R,MIN}$<$\Delta_1$; and
    (ii) an outer cladding 54 with a refractive index delta $\Delta_{Outer-Clad}$ relative to pure silica, such that $\Delta_{Outer-Clad}$>$\Delta_{R,MIN}$; the second fiber introducing differential mode delay $DMD_2$ for all wavelengths between 1525 and 1570 nm 1 ps/km≤|$DMD_2$|≤100 ps/km, and a second differential mode delay slope $DMDS_2$ that has an opposite sign from the first dispersion slope $DMDS_1$;

and the total differential mode delay provided by the first fiber 10 in combination with the second fiber 10' is $DMD_{tot}$=$DMD_1$+$DMD_2$, and $DMD_{tot}$ is less than 1.0 ps/km and more than −1.0 ps/km for all wavelengths between 1525 and 1570 nm.

According to at least some embodiments the first optical fiber 10 has an effective area Aeff1 of $LP_{01}$ mode at a wavelength λ=1550 nm such that 140 μm² <Aeff1$_{λ=1550}$<325 μm²; and the second optical fiber 10' has an effective area Aeff2 of $LP_{01}$ mode at a wavelength λ=1550 nm such that 140 μm²<Aeff2$_{λ=1550}$<325 μm².

According to at least some embodiments,
the first optical fiber 10 comprises −0.02%≤$\Delta_0$≤0.1%, and −0.1%≤$\Delta_1$≤0% where $\Delta_1$<$\Delta_0$; and $\Delta_{R,MIN}$−0.25% and −0.4% (preferably between −0.3% and −0.4%) measured relative to pure $SiO_2$; and
the second optical fiber 10' comprises −0.02%≤$\Delta_0$≤0.1%, and − and −0.1%≤$\Delta_1$<0% where $\Delta_1$<$\Delta_0$; and $\Delta_{R,MIN}$ between −0.25% and −0.4% (preferably between −0.3% and -0.4%), measured relative to pure $SiO_2$. According to some embodiments −0.04%≤$\Delta_1$≤−0.004%. According to some embodiments $\Delta_{Outer-Clad}$ is −0.2% to −0.3%.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber span comprising:
(I) a first optical fiber, the first optical fiber comprising a core having (i) an inner core region with maximum refractive index delta, $\Delta_0 \leq 0.1\%$ and an outer radius $R_1$ wherein $R_1 > 4.5$ μm, and (ii) an outer core region with an outer radius $R_2$ and a minimum refractive index delta $\Delta_1$ and alpha value α wherein $\alpha \geq 5$, wherein $\Delta_1 < \Delta_0$, 5.5 μm $\leq R_2 - R_1 \leq 12$ μm; and an annular cladding surrounding the core, the cladding including (i) a low index ring surrounding the core and having a minimum refractive index delta $\Delta_{R,MIN}$, where $\Delta_{R,MIN} < \Delta_1$; and (ii) an outer cladding with a refractive index delta $\Delta_{Outer-Clad}$ relative to pure silica, such that $\Delta_{Outer-Clad} > \Delta_{R,MIN}$;

said first fiber introducing differential mode delay $DMD_1$ for wavelengths between 1525 and 1570 nm, and a first differential mode delay slope $DMDS_1$; and (II) a second optical fiber coupled to the first optical fiber, the second optical fiber comprising a core having:

(i) an inner core region with maximum refractive index delta of the core, $\Delta_0 \leq 0.1\%$ wherein $R_1 > 4.5$ μm, and (ii) an outer core region with an outer radius $R_2$ and a minimum refractive index delta $\Delta_1$ and alpha value α wherein $\alpha \geq 5$, where $\Delta_1 < \Delta_0$, and 5.5 μm $\leq R_2 - R_1 \leq 12$ μm; and an annular cladding surrounding the core, the cladding including (i) a low index ring surrounding the core and having a minimum refractive index delta $\Delta_{R,MIN}$, where $\Delta_{R,MIN} \leq \Delta_1$; and (ii) an outer cladding with a refractive index delta $\Delta_{Outer-Clad}$ relative to pure silica, such that $\Delta_{Outer-Clad} > \Delta_{R,MIN}$; said second fiber introducing differential mode delay $DMD_2$ for wavelengths between 1525 nm and 1570 nm, and a second differential mode delay slope $DMDS_2$ that has an opposite sign from the first dispersion slope $DMDS_1$;

and wherein total differential mode delay provided by said first fiber in combination with said second fiber is $DMD_{tot} = DMD_1 + DMD_2$, and $DMD_{tot}$ is less than 1.0 ps/km and more than −1.0 ps/km for all wavelengths between 1525 nm and 1570 nm.

2. The fiber span of claim 1, wherein: (i) the inner core region of said first optical fiber has the outer radius $R_1 > 5$ μm; and (ii) the inner core region of said second optical fiber has the outer radius $R_1 > 5$ μm.

3. The fiber span of claim 2, wherein: (i) the inner core region of said first optical fiber has the outer radius $R_1 > 6$ μm; and (ii) the inner core region of said second optical fiber has the outer radius $R_1 > 6$ μm.

4. The fiber span of claim 2, wherein: (i) the inner core region of said first optical fiber has the outer radius $R_1 > 7$ μm; and (ii) the inner core region of said second optical fiber has the outer radius $R_1 > 7$ μm.

5. The fiber span of claim 1, wherein said first optical fiber has
6 μm $\leq R_2 - R_1 \leq 11$ μm; and
said second optical fiber has 6 μm $\leq R_2 - R_1 \leq 11$ μm.

6. The fiber span of claim 1, wherein said first optical fiber has
8 μm $\leq R_2 - R_1 \leq 10$ μm; and
said second optical fiber has 8 μm $\leq R_2 - R_1 \leq 10$ μm.

7. The fiber span of claim 1, wherein −0.8 ps/km $\leq DMD_{tot} \leq 0.8$ ps/km for all wavelengths between 1525 and 1570 nm.

8. The fiber span of claim 1, wherein −0.5 ps/km $\leq DMD_{tot} \leq 0.5$ ps/km for all wavelengths between 1525 and 1570 nm.

9. The fiber span of claim 1, wherein −0.25 ps/km $\leq DMD_{tot} \leq 0.25$ ps/km for all wavelengths between 1525 and 1570 nm.

10. The fiber span of claim 1, wherein −0.15 ps/km $\leq DMD_{tot} \leq 0.15$ ps/km for all wavelengths between 1525 and 1570 nm.

11. The fiber span of claim 1, wherein $DMD_{tot}$ is positive for at least some of the wavelengths in the 1525 and 1570 nm range and is negative for at least some of wavelengths in the 1525 and 1570 nm range.

12. The fiber span of claim 1, wherein $DMD_{tot} = 0$ ps/km at a wavelength situated between 1540 nm and 1560 nm.

13. The fiber span of claim 1, wherein the first DMD slope is positive and the second DMD slope is negative.

14. The fiber span of claim 1, wherein the first DMD slope is negative and the second DMD slope is positive.

15. The fiber span of claim 1, wherein (i) 1 ps/km $\leq DMD_1 \leq 100$ ps/km for all wavelengths between 1525 and 1570 nm and −100 ps/km $\leq DMD_2 \leq -1$ ps/km for all wavelengths between 1525 and 1570 nm; or (ii) −100 ps/km $\leq DMD_1 \leq -1$ ps/km for all wavelengths between 1525 and 1570 nm and -1 ps/km $\leq DMD_1 \leq 100$ ps/km for all wavelengths between 1525 and 1570 nm.

16. The fiber span of claim 1, wherein the first fiber has a length $L_1$ and the second fiber has a length $L_2$ and wherein 10 km $\leq L_1 + L_2 \leq 120$ km.

17. The fiber span of claim 1, wherein the first fiber has a length $L_1$ and the second fiber has a length $L_2$ and wherein $0.9 \leq L_1/L_2 \leq 1.15$.

18. The fiber span of claim 17, wherein $0.95 \leq L_1/L_2 \leq 1.1$.

19. The fiber span of claim 17, wherein 40 km $\leq L_1 + L_2 \leq 100$ km.

20. The fiber span of claim 1, wherein the first optical fiber has the ratio of $R_2/R_1 < 2.2$, and the second optical fiber also has the ratio of $R_2/R_1 < 2.2$.

21. The fiber span of claim 1, wherein the first optical has an effective area $Aeff1_{\lambda=1550}$ of $LP_{01}$ mode at a wavelength $\lambda = 1550$ nm such that 140 μm² $< Aeff_{\lambda=1550} < 325$ μm²; and the second optical fiber has an effective area $Aeff2_{\lambda=1550}$ of $LP_{01}$ mode at a wavelength $\lambda = 1550$ nm such that 140 μm² $< Aeff_{\lambda=1525} < 325$ μm².

22. The fiber span of claim 1, wherein
the first optical fiber comprises
−0.02% $\leq \Delta_0 \leq 0.1\%$, and −0.05% $\leq \Delta_1 \leq 0\%$; and $\Delta_{R,MIN} \leq -0.30\%$, measured relative to pure $SiO_2$; and
the second optical fiber comprises
−0.02% $\leq \Delta_0 \leq 0.1\%$, and −0.05% $\leq \Delta_1 \leq 0\%$; and $\Delta_{R,MIN} \leq -0.30\%$, measured relative to pure $SiO_2$.

23. A fiber span comprising:
(I) a first few moded optical fiber, the first optical fiber comprising a core having
(i) an inner core region with maximum refractive index delta, $\Delta_0 \leq 0.1\%$ and an outer radius $R_1$ wherein $R_1 > 4.5$ μm, and
(ii) an outer core region with an outer radius $R_2$ and a minimum refractive index delta $\Delta_1$ and alpha value α wherein $\alpha \geq 5$, wherein $\Delta_1 < \Delta_0$, 5.5 μm $\leq R_2 - R_1 \leq 12$ μm; and
an annular cladding surrounding the core, the cladding including
(i) a low index ring surrounding the core and having a minimum refractive index delta $\Delta_{R,MIN}$, where $\Delta_{R,MIN} < \Delta_1$; and (ii) an outer cladding with a refractive index delta $\Delta_{Outer\text{-}Clad}$ relative to pure silica, such that $\Delta_{Outer\text{-}Clad} > \Delta_{R,MIN}$;
said first fiber introducing positive differential mode delay $DMD_1$ for wavelengths between 1525 nm and 1570 nm, wherein 1 ps/km ≤ $DMD_1$ ≤ 100 ps/km, and a first differential mode delay slope $DMDS_1$; and (II) a second few moded optical fiber coupled to the first few moded optical fiber, the second optical fiber comprising a core having:
  (i) an inner core region with maximum refractive index delta of the core, $\Delta_0$ ≤ 0.1% wherein $R_1$ > 4.5 µm, and
  (ii) an outer core region with an outer radius $R_2$ and a minimum refractive index delta $\Delta_1$ and alpha value α wherein α ≥ 5, where $\Delta_1 < \Delta_0$, and 5.5 µm ≤ $R_2 - R_1$ ≤ 12 µm; and
    an annular cladding surrounding the core, the cladding including
  (i) a low index ring surrounding the core and having a minimum refractive index delta $\Delta_{RMIN}$, where $\Delta_{R,MIN} < \Delta_1$; and
  (ii) an outer cladding with a refractive index delta $\Delta_{Outer\text{-}Clad}$ relative to pure silica, such that $\Delta_{Outer\text{-}Clad} > \Delta_{R,MIN}$, said second fiber introducing negative differential mode delay $DMD_2$ for wavelengths between 1525 and 1570 nm wherein −100 ps/km ≤ $DMD_2$ ≤ −1 ps/km, and a second differential mode delay slope $DMDS_2$ that has an opposite sign from the first dispersion slope $DMDS_1$;

and wherein
total differential mode delay provided by said first fiber in combination with said second fiber is $DMD_{tot} = DMD_1 + DMD_2$, and $DMD_{tot}$ is less than 1.0 ps/km and more than −1.0 ps/km for all wavelengths between 1525 nm and 1570 nm.

24. A fiber span comprising:
(I) a first few moded optical fiber, the first optical fiber comprising a core having
  (i) an inner core region with maximum refractive index delta, $\Delta_0$ ≤ 0.1% and an outer radius $R_1$ wherein $R_1$ > 4.5 µm, and
  (ii) an outer core region with an outer radius $R_2$ and a minimum refractive index delta $\Delta_1$ and alpha value α wherein α ≥ 5, wherein $\Delta_1 < \Delta_0$, 5.5 µm ≤ $R_2 - R_1$ ≤ 12 µm; and
    an annular cladding surrounding the core, the cladding including
  (i) a low index ring surrounding the core and having a minimum refractive index delta $\Delta_{RMIN}$, where $\Delta_{R,MIN} < \Delta_1$; and
  (ii) an outer cladding with a refractive index delta $\Delta_{Outer\text{-}Clad}$ relative to pure silica, such that $\Delta_{Outer\text{-}Clad} > \Delta_{R,MIN}$;
said first fiber introducing negative differential mode delay $DMD_1$ for wavelengths between 1525 nm and 1570 nm, wherein −100 ps/km ≤ $DMD_1$ ≤ 1 ps/km, and a first differential mode delay slope $DMDS_1$; and (II) a second few moded optical fiber coupled to the first few moded optical fiber, the second optical fiber comprising a core having:
  (i) an inner core region with maximum refractive index delta of the core, $\Delta_0$ < 0.1% wherein $R_1$ > 4.5 µm, and
  (ii) an outer core region with an outer radius $R_2$ and a minimum refractive index delta $\Delta_1$ and alpha value α wherein α ≥ 5, where $\Delta_1 < \Delta_0$, and 5.5 µm ≤ $R_2 - R_1$ ≤ 12 µm; and
    an annular cladding surrounding the core, the cladding including
  (i) a low index ring surrounding the core and having a minimum refractive index delta $\Delta_{RMIN}$, where $\Delta_{R,MIN} < \Delta_1$; and
  (ii) an outer cladding with a refractive index delta $\Delta_{Outer\text{-}Clad}$ relative to pure silica, such that $\Delta_{Outer\text{-}Clad} > \Delta_{R,MIN}$; said second fiber introducing positive differential mode delay $DMD_2$ for wavelengths between 1525 and 1570 nm wherein 1 ps/km ≤ $DMD_2$ ≤ 100 ps/km, and a second differential mode delay slope $DMDS_2$ that has an opposite sign from the first dispersion slope $DMDS_1$;

and wherein
total differential mode delay provided by said first fiber in combination with said second fiber is $DMD_{tot} = DMD_1 + DMD_2$, and $DMD_{tot}$ is less than 1.0 ps/km and more than −1.0 ps/km for all wavelengths between 1525 nm and 1570 nm.

* * * * *

UNITED STATES PATENT AND TRADEMARK OFFICE
CERTIFICATE OF CORRECTION

PATENT NO. : 9,857,529 B2
APPLICATION NO. : 15/416073
DATED : January 2, 2018
INVENTOR(S) : William Allen Wood It is certified that error appears in the above-identified patent and that said Letters Patent is hereby corrected as shown below:

On the Title Page

Column 2, item (56), Line 1, delete ""ifferential" and insert -- "Differential --, therefor.

Column 2, item (57), Line 3, delete "the an" and insert -- an --, therefor.

On page 2, Column 1, item (56), Line 1, delete "transm1ss1on" and insert -- transmission --, therefor.

In the Claims

In Column 17, Line 31, Claim 1, delete "$\Delta_{R,MIN} \leq \Delta_1$;" and insert -- $\Delta_{R,MIN} < \Delta_1$; --, therefor.

In Column 19, Line 23, Claim 23, delete "$\Delta_{R,MIN}$," and insert -- $\Delta_{R,MIN}$; --, therefor.

In Column 20, Line 18, Claim 24, delete "$\Delta_0 < 0.1\%$" and insert -- $\Delta_0 \leq 0.1\%$ --, therefor.

Signed and Sealed this
Twenty-seventh Day of December, 2022

Katherine Kelly Vidal
*Director of the United States Patent and Trademark Office*